US010147137B2

United States Patent
Bent

(10) Patent No.: US 10,147,137 B2
(45) Date of Patent: Dec. 4, 2018

(54) SYSTEMS AND/OR METHODS FOR AUTOMATIC ORDERING OF PRE-TRADE ORDER EVALUATIONS

(71) Applicant: Software AG, Darmstadt (DE)

(72) Inventor: Martin Bent, Cambridge (GB)

(73) Assignee: SOFTWARE AG, Darmstadt (DE)

( * ) Notice: Subject to any disclaimer, the term of this patent is extended or adjusted under 35 U.S.C. 154(b) by 509 days.

(21) Appl. No.: 14/515,650

(22) Filed: Oct. 16, 2014

(65) Prior Publication Data

US 2016/0110806 A1 Apr. 21, 2016

(51) Int. Cl.
*G06Q 40/00* (2012.01)
*G06Q 40/04* (2012.01)

(52) U.S. Cl.
CPC .................. *G06Q 40/04* (2013.01)

(58) Field of Classification Search
CPC ........................................ G06Q 40/04
USPC ........................... 705/35, 36 R, 37
See application file for complete search history.

(56) References Cited

U.S. PATENT DOCUMENTS

| | | | |
|---|---|---|---|
| 7,685,044 B1 * | 3/2010 | Robertson | G06Q 40/00 705/35 |
| 8,418,240 B2 | 9/2013 | Wool | |
| 2004/0153389 A1 * | 8/2004 | Lortscher, Jr. | G06Q 30/02 705/36 R |
| 2004/0199452 A1 | 10/2004 | Johnston et al. | |
| 2009/0276367 A1 | 11/2009 | Rosenthal | |
| 2012/0130884 A1 * | 5/2012 | Ellis | G06Q 40/08 705/37 |
| 2014/0207649 A1 * | 7/2014 | Ellis | G06Q 40/04 705/37 |

FOREIGN PATENT DOCUMENTS

WO  2012/113013  8/2012

* cited by examiner

*Primary Examiner* — Samica L Norman
(74) *Attorney, Agent, or Firm* — Nixon & Vanderhye P.C.

(57) ABSTRACT

Certain example embodiments described herein relate to systems and/or methods for electronic trading. An example embodiment stores pre-trade order evaluation rules in a memory. The embodiment includes receiving at least one trading order, determining a sequencing of the pre-trade order evaluation rules based on one or more dynamically updated performance metrics associated with the pre-trade order evaluation rules, applying the pre-trade order evaluation rules to the at least one received trading order in accordance with the determined sequencing, and based on results from the applying, either transmitting the at least one received trading order to a trading exchange or rejecting the at least one received trading order.

17 Claims, 22 Drawing Sheets

FIG. 4

| Thread 1 | Thread 2 |
|---|---|
| Rule 2 | Rule 3 |
|  | Rule 1 |

FIG. 5

| Parameter | Description | Component |
|---|---|---|
| Rules | The names of the Rules the System runs with | Rule Scheduler |
| Metrics | The names of the Metrics the Monitor will run | Metric Monitor |
| Threads | The number of concurrent threads the system will have | Rule Order Calculator |
| Timeout | How often to re-calculate the Rule Map | Rule Order Calculator |
| Weights | The weights to be given to the metrics | Rule Order Calculator |

FIG. 6

| Rule | % reject | Processing time (ms) |
|---|---|---|
| K | 0.01 | 25 |
| L | 2 | 10 |
| M | 25 | 1 |

FIG. 7

| | Map 1 | | Map 2 | | Map 3 | | Map 4 | | Map 5 | | Map 6 | |
|---|---|---|---|---|---|---|---|---|---|---|---|---|
| | T1 | T2 | T1 | T2 | T1 | T2 | T1 | T2 | T1 | T2 | T1 | T2 |
| | K L | | K L | | M L | | K M | | M K | | M L | |
| | M | | M | | K | | L | | L | | K | |
| Max Passed time (ms) | 26 | | 25 | | 26 | | 25 | | 35 | | 35 | |
| Longest thread | (K + M) | | (K) | | (M + K) | | (K) | | (K + L) | | (L + K) | |
| Orders processed (P) | P - 10000 | P - 10000 | P - 10000 | P - 10000 | P - 10000 | P - 10000 | P - 10000 | P - 10000 | P - 10000 | P - 10000 | P - 10000 | P - 10000 |
| and rejected (R) | R - 1 P - 9999 R - 2500 | R - 200 | R - 1 P - 2500 | R - 200 P - 9800 R - 2450 | R - 1 P - 2500 P - 7500 | R - 200 R - 1 | R - 1 R - 2500 | R - 2500 P - 7500 R - 150 | R - 2500 | R - 1 P - 9999 R - 200 | R - 2500 | R - 200 P - 9800 R - 1 |
| Avg Rejected time (ms) | M - (2500 * 1) = 2500 | K - (1 * 25) = 25 | K - (1 * 25) = 25 | M - (2450 * 1) = 2450 | M - (2500 * 1) = 2500 | K - (1 * 25) = 25 | K - (1 * 25) = 25 | M - (2500 * 1) = 2500 | M - (2500 * 1) = 2500 | K - (1 * 25) = 25 | M - (2500 * 1) = 2500 | K - (1 * 25) = 25 |
| SUM(Orders reject * time) / total rejects orders | L - (200 * 10) = 2000 (25 + 2500 + 2000) / 2701 = 1.675 | | L - (200 * 10) = 2000 (25 + 2000 + 2450) / 2651 = 1.688 | | L - (200 * 10) = 2000 (2500 + 25 + 2000) / 2701 = 1.675 | | L - (150 * 10) = 1500 (25 + 2500 + 1500) / 2651 = 1.518 | | L - (200 * 10) = 2000 (2500 + 25 + 2000) / 2701 = 1.675 | | L - (200 * 10) = 2000 (2500 + 25 + 2000) / 2701 = 1.675 | |

```
// An implementation of a Metric which calculates the percentage of orders rejected.
Metric RejectRate {

// Counts of the number of times each rule has been evaulated
    map<rule, count> totalEvaluations;

// Counts of the number of times each rule has failed
    map<rule, count> rejectedEvaluations;

def start(rule, order) {
        totalEvaluations[rule] := totalEvaluations[rule] + 1;
    } def end(rule, order, result) {
        if not result {
            rejectedEvaluations[rule] := rejectedEvaluations[rule] + 1;
        }
    } def get(rule) {
        return rejectedQueries[rule] / totalQueries[rule];
    }
}
```

```
Metric ProcessingTime {

// Counts of the number of times each rule has been evaluated
    map<rule, count> totalEvaluations;

// Cumulative time spent evaluating each rule
    map<rule, time> totalEvaluationTime;

// Start time for in-progress evaluations
    map<rule, order, time> evaluationStartTime;

def start(rule, order) {
        totalEvaluations[rule] := totalEvaluations[rule] + 1;
        evaluationStartTime[rule, order] := getCurrentTime();
    } def end(rule, order, result) {
        totalEvaluationTime[rule] := totalEvaluationTime[rule] +
getCurrentTime() - evaluationStartTime[rule, order];
    } def get(rule) {
        return totalEvaluationTime[rule] / totalEvaluations[rule];
    }
}
```

FIG. 12

```
def SyncRuleProcessor() {

// Order list of Rules to process
    List< Rule > Rules;
    // The list of metrics to order our rule processing by
    Map< Metric, Weight > MetricRepository;

def init( List< Rule > _rules, Map< Metric, Weight > _metrics ) {
        Rules = _rules;
        Metrics = _metrics;
    } def processOrder(order) {

// Evaluate each rule in priority order
        for rule in Rules {

// Start evaluation of all metrics for this <rule,order> pair
            for metric in MetricRepository {
                metric.start(rule, order);
            }

// Evaluate the rule for this order
            result := rule.evaluate(order);

// Update all metrics for this <rule, order> pair
            for metric in MetricRepository {
                metric.end(rule, order, result);
            }

// Reject order if any rule fails
            if not result {
                return false;
            }
        }
    }
}
```

```
// All rules passed so the order is allowed
   return true;
} def updateRulePriorities {
    map<rule, priority> rulePriorities;

// Calculate priority of each rule as a weighted average of its
metrics
    for rule in Rules {
        rulePriorities[rule] := 0;
        for < metric, weight > in MetricRepository {
            rulePriorities[rule] := rulePriorities[rule] +
(weight * metric.get(rule));
        }
        rulePriorities[rule] := rulePriorities[rule] / size(Rules);
    }

// Sort rules by descending priority
    sortRules(rulePriorities);
}
```

FIG. 13b

```
def PreTradeRiskChecker {
    // Define the Rules we want to run in our Risk Checker
    List rules = [ SimpleRule, LongRunningRule, HighRejectRule ];
    // Define the metrics to use and their weights
    Map metrics = { RejectRate:1 };
    // Create our Rule Processor using the rule list and the Metric to use to re-
order them
    SyncRuleProcessor processor( rules, metrics );

// Process an order from a Trade/GUI and block until finished
    def ProcessOrderFromGUI( Order order ) {
        // The Rules will be processed in order
        if processor.processOrder( order ) {
            // Send the order to the exchange
            Exchange.SendOrder( order );
        } else {
            // Reject the order - raise an Alert
            Alert.OrderRejected( order );
        }

// Update the rule order
        processor.updateRulePriorities();
    }
}
```

```
// Asynchronous Rule Processor
def AsyncRuleProcessor() {

// Map of thread id to Rules to process.
    Map< integer, List< Rule > > RuleMap;
    // The list of metrics to order our rule processing by
    Map< Metric, Weight > MetricRepository;

Callback orderCallback;
    integer resultCount;

def init( Map< integer, List< Rule > > _ruleMap, Map< Metric, Weight > _metrics ) {
        RuleMap = _ruleMap;
        Metrics = _metrics;
    } def processOrder(order, callback) {

// Store the callback for when order is processed
        orderCallback = callback;
        resultCount = 0;
        // Evaluate first rule for each thread
        for <threadId, Rules> in RuleMap {

// Run the first rule
            runRule(order, rule, threadId, 0);

}
    } def runRule(order, rule, threadId, count) { rule = RuleMap[threadId][count];
```

```
// Start evaluation of all metrics for this <rule,order> pair
for metric in MetricRepository {
    metric.start(rule, order);
}

// Evaluate the rule for this order
rule.evaluate(order, threadId, count, ruleCallback);

def ruleCallback(rule, order, result, threadId, count) {
    // Update all metrics for this <rule, order> pair
    for metric in MetricRepository {
        metric.end(rule, order, result);
    }

// Update our result count
    ++resultCount;

// Reject order if any rule fails
    if not result {
        orderCallback( false );
        return;
    }

// Rule the next Rule in this thread
    if count < RuleMap[threadId].size() {
        runRule(order, rule, threadId, count++);
    }

// All rules passed so the order is allowed
```

```
def PreTradeRiskChecker {
    // Define the Rules we want to run in our Risk Checker
    List rules = [ SimpleRule, LongRunningRule, HighRejectRule ];
    // Define the metrics to use and their weights.
    // Weight the processing time more than the reject rate.
    Map metrics = { ProcessingTime:9, RejectRate:1 };
    // Create our Rule Processor using the rule list and the Metric to use to re-
order them
    AsyncRuleProcessor processor( rules, metrics );

// Setup a timer to update the rule priorities every 30 seconds
    Timer.every(30) {
        // Update the rule order
        processor.updateRulePriorities();
    }

// Process an order from a Trade/GUI
    def ProcessOrderFromGUI( Order order ) {
        // The Rules will be processed in order
        processor.processOrder( order, Callback );
    } def Callback( success ) {
        if success {
            // Send the order to the exchange
            Exchange.SendOrder( order );
        } else {
            // Reject the order - raise an Alert
            Alert.OrderRejected( order );
        }
    }
}
```

SYSTEMS AND/OR METHODS FOR AUTOMATIC ORDERING OF PRE-TRADE ORDER EVALUATIONS

TECHNICAL FIELD

Certain example embodiments described herein relate to systems and/or methods for computer processing of electronic trading (e.g., securities trading). More particularly, certain example embodiments relate to systems and techniques for optimizing pre-trade risk calculations associated with trades.

BACKGROUND AND SUMMARY

An integral part of many modern electronic trading systems is a pre-trade risk checking system. Typically, an order for a trade is originated at a trading system and transmitted over a network to a trading exchange where the actual transaction involving the order occurs. Before the order is transmitted from the trading system to the trading exchange, a pre-trade risk checking system checks to help ensure that the order passes a set of one or more predefined rules that represent trading risk checks. These checks, which are usually encoded as computer code, help ensure that the parameters of the order (e.g., price, quantity, etc.) do not exceed specified constraints. The checking of whether each incoming order of a plurality of orders passes its test against the set of rules may of course be automated and performed without further operator intervention. If an order passes all the rules of the set of rules, then the order may be transmitted to the trading exchange.

The time that it takes to get an order to the trading exchange oftentimes is a key factor in a trading system. For example, in high-frequency and algorithmic trading systems, where milliseconds wasted potentially could result in a missed trading opportunity (e.g., because a competitor has already traded), minimizing latency could be even more important.

Certain example embodiments described herein provide for reducing the time between when the order is input to the trading system, and when the order is transmitted to the trading exchange.

In certain example embodiments, an electronic trading system is provided. A memory is configured to store a plurality of pre-trade order evaluation rules, wherein each pre-trade order evaluation rule includes at least one condition. A processing system includes at least one processor, with the processing system being configured to perform operations comprising: enabling receipt of at least one trading order; determining, based on one or more dynamically updated performance metrics associated with the plurality of pre-trade order evaluation rules, a sequencing of the plurality of pre-trade order evaluation rules; applying the pre-trade order evaluation rules to the at least one received trading order in accordance with the determined sequencing, wherein, in response to the applying, a respective result is obtained with respect to each applied pre-trade order evaluation rule; and based on the obtained respective results, either transmitting the at least one received trading order to a trading exchange or rejecting the at least one received trading order.

In certain example embodiments, an electronic trading method is provided. A plurality of pre-trade order evaluation rules are stored in a memory, wherein each pre-trade order evaluation rule includes at least one condition. At least one trading order is electronically received. A determination is made, using a processing system including at least one processor, and based on one or more dynamically updated performance metrics associated with the plurality of pre-trade order evaluation rules, as to a sequencing of the plurality of pre-trade order evaluation rules. Using the processing system, the pre-trade order evaluation rules are applied to the at least one received trading order in accordance with the determined sequencing. In response to the applying, a respective result is obtained with respect to each applied pre-trade order evaluation rule. Based on the obtained respective results, either the at least one received trading order is electronically transmitted to a trading exchange over a network or the at least one received trading order is rejected.

In certain example embodiments, there is provided a non-transitory computer-readable storage medium having stored thereon computer program instructions that, when executed by a processor of computer, cause the computer to perform operations comprising: storing a plurality of pre-trade order evaluation rules in a memory, wherein each pre-trade order evaluation rule includes at least one condition; enabling electronic receipt of at least one trading order; determining, based on one or more dynamically updated performance metrics associated with the plurality of pre-trade order evaluation rules, a sequencing of the plurality of pre-trade order evaluation rules; applying the pre-trade order evaluation rules to the at least one received trading order in accordance with the determined sequencing, wherein, in response to the applying, a respective result is obtained with respect to each applied pre-trade order evaluation rule; and based on the obtained respective results, either electronically transmitting the at least one received trading order to a trading exchange over a network or rejecting the at least one received trading order.

According to certain example embodiments, the determining may include selecting the sequencing in order to minimize a processing time associated with the sequencing, a processing time for rejected orders, and/or the like.

These aspects, features, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 4 illustrates a simplified example rule processing map, in accordance with certain example embodiments;

FIG. 5 is a table illustrating example configuration parameters, in accordance with certain example embodiments;

FIG. 6 is a table illustrating example metrics for rules, in accordance with certain example embodiments;

FIG. 7 is a matrix for selecting a rule map, in accordance with certain example embodiments;

FIG. 11 is a listing of pseudocode for an example implementation of a metric for determining a reject rate, according to certain example embodiments;

FIG. 12 is a listing of pseudocode for an example implementation of a metric for determining processing time, according to certain example embodiments;

FIGS. 13a and 13b (collectively FIG. 13) are listings of pseudocode for an example implementation of a synchronous rule processor for pre-trade risk checking, according to certain example embodiments;

FIG. 14 is a listing of pseudocode for an example implementation of a pre-trade risk checker with synchronous rule processing, according to certain example embodiments;

FIGS. 15a and 15b (collectively FIG. 15) are listings of pseudocode for an example implementation of an asynchronous rule processor for pre-trade risk checking, according to certain example embodiments;

FIG. 16 is a listing of pseudocode for an example implementation of a pre-trade risk checker with asynchronous rule processing, according to certain example embodiments;

DETAILED DESCRIPTION OF CERTAIN EXAMPLE EMBODIMENTS

Certain example embodiments relate to systems and/or methods that provide for electronic trading systems with improved latencies. Certain example embodiments automatically analyze and rearrange a plurality of rules that are processed for a trading order before that order is transmitted to the trading exchange. It will be appreciated that although certain example embodiments are described in relation to securities trading systems, the present invention is not limited to these specific examples. In this regard, different embodiments may encompass one or more of these and/or other trading systems such as, for example, auctions, trading systems for goods and/or services, and/or the like.

Certain example embodiments help overcome numerous disadvantages of conventional electronic trading systems, e.g., by dynamically and in real-time rearranging a plurality of pre-trade order evaluation rules in order to minimize or reduce the delay or latency associated with processing those rules. By minimizing or reducing the delay associated with executing the pre-trade risk check rules, certain example embodiments help improve the capabilities of electronic trading systems, including high-frequency and algorithmic trading systems, to access the trading exchange with trading orders in highly optimized or improved time, thereby improving the potential for advantageous trades.

Figure 1:
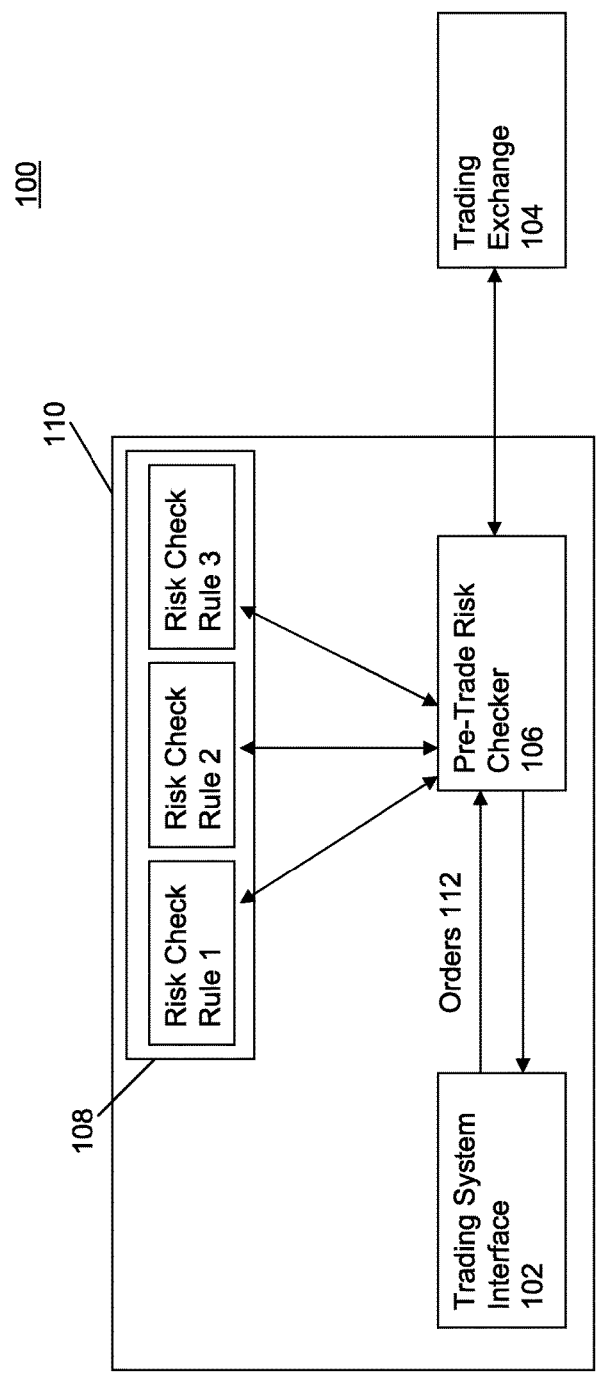
FIG. 1 is a block diagram of a trading environment, in accordance with certain example embodiments.

FIG. 1 is a block diagram of an electronic trading environment 100 in accordance with certain example embodiments. The electronic trading environment 100 includes a trading system 110 and a trading exchange 104. The trading system 110 includes a trading system interface 102, a pre-trade risk checker 106, and pre-trade risk check rules collection 108.

When a trading opportunity is identified by the trading system interface 102 or the trading system 110, based either on input from a human operator (not shown) or from a trading algorithm (not shown), an order 112 is created to be sent to the trading exchange 104. Before the order 112 is sent to the trading exchange 104, however, the order 112 is processed by the pre-trade risk checker 106 to help ensure the parameters of the order 112 are within predefined constraints. The pre-trade risk checker 106 may perform a plurality of different checks (e.g., apply rules from rules collection 108) that verify whether respective parameters and/or combinations of parameters associated with the order 112 satisfy predefined constraints. The applied rules may include, but are not limited to, one or more of: checking whether a price (e.g., a price of a security) included in the order is within constraints; checking whether a quantity (e.g., a quantity of a security) included in the order is within constraints; checking whether a value (e.g., price x quantity) included in the order is within constraints; checking whether executing the order would not create an unwanted position (e.g., according to regulations of the trading exchange and/or according to preferences set in profile of user/trader) for the trader; checking whether the timing of the order compared to other orders is acceptable (e.g., whether throttling of orders is required); and/or the like.

Rules from rules collection 108 are pre-trade order evaluation rules configured in order to help ensure that the trading system 102 does not send out orders 112 that are defective, such as those that may have been generated by an incorrectly behaving trading algorithm or human error. In certain example embodiments, the rules are implemented as program code, which may be executed by, or in response to a query from, a component such as the pre-trade risk checker 106. Execution of a program code of a rule with respect to a particular order may result in returning a success indication or a failure indication depending on the evaluation of the rule.

If an order 112 passes all the rules of a selected set of rules from the rules collection 108, the order 112 is then transmitted to the trading exchange 104 to be traded against (e.g., to perform a transaction). If the order 112 fails at least one of the rules in the selected set of rules, the trading system 110 and/or the trading system interface 102 may be notified so that the problem can be corrected. In certain example embodiments, any order 112 that fails at least one rule from the selected set of rules is not transmitted to the trading exchange, and is instead discarded or returned to the trading system interface 102 so that the user/trader can be notified.

The pre-trade order evaluation rules can be run either synchronously or asynchronously. Some of the pre-trade order evaluation rules can also execute any arbitrary code and, thus, it is possible for them to take an unbounded amount or widely varying amounts of time to execute. Because it is may be deemed essential that any order submitted to the trading exchange first successfully pass this set of rules 108, the latency of these rule execution could be crucial to the effectiveness of the electronic trading system. High-frequency and algorithmic trading systems depend on having the minimum latency possible, where milliseconds wasted could result in a missed trading opportunity because a competitor may already complete a trade in that time. The order or sequence in which these pre-trade evaluation rules are processed can have a significant impact on the latency of the trading system. Conventional techniques for electronic trading do not specifically address latency issues associated with processing pre-trade evaluation rules. Conventional electronic trading systems process any pre-trade order evaluation rules either in a random order, or in a pre-determined static order.

Trading exchanges may be thought of as dynamic systems with frequently changing variables and, consequently, the metrics of a pre-trade risk calculation (e.g., processing time, percentage rejected, etc.) can also change frequently. A risk check rule that currently passes all orders successfully may have a high reject percentage only a few seconds later as an underlying variable (e.g., price of a security on the exchange, position of a trader, etc.) changes. Any manual human intervention or the like is likely to be out-of-date rather quickly, leaving the pre-trade risk checking system in a non-optimal state, causing substantial delay in trades and wasted time in re-configuring the trading system.

Certain example embodiments disclosed herein provide for automatically re-ordering the processing order of the pre-trade risk checks according to certain criteria to minimize or reduce the latency associated with the pre-trade order evaluations. Certain example embodiments may include frequently updating the processing sequence of the evaluation rules in order to optimize or improve the performance of the pre-trade risk checker without wasted human interaction.

Certain example embodiments may have all of the logic associated with the pre-trade risk checking system implemented in a software-inclusive system. A software-inclusive system may have certain advantages over a completely embedded electronic trading systems such as, for example, being easier and less costly to repair, easier to maintain in real-time (such as an electronic trading system) where protocols are constantly evolving, easier to upgrade when new functionality is required (such as a new pre-trade order evaluation rule), easier to scale, etc.

Certain example embodiments may be made specific to pre-trade risk checks in electronic trading systems that use a black list where an order must pass (i.e., successfully be evaluated against) every rule in order to be allowed through to the trading exchange. It will be appreciated that what is generally known as a white list of rules, which is designed to only allow an event through if it matches against one or more rules, may not be adequate for all embodiments. In certain example embodiments, multiple metrics, such as the proportion of orders that are rejected or the processing time to pass an order, may be specified on or for each rule. It will be appreciated that whereas certain example embodiments may reorder the rules so as to reduce the latency of the pre-trade risk checking system, such reordering may or may not to reduce CPU usage. The re-ordering may be performed based on plural latency-related criteria, by processing the metrics on-line and in real-time to continuously and dynamically re-order and optimize or improve the order the rules are processed in. CPU usage thus may be constant in some instances (e.g., where all rules are evaluated, but simply in a different order). In other instances, CPU usage may be decreased if a trade is aborted earlier. In some embodiments, the estimated or potential CPU usage of rules may be considered as a parameter in the re-ordering. For example, CPU intensive rules may be placed after rules that have a high likelihood of rejection.

The trading system 110 may include one or more server computers, personal computers, handheld computing devices, etc. In certain example embodiments, pre-trade risk checker 106 may be on a different processing platform from one or more other components of the trading system 110. Trading exchange 104 may include one or more servers or other type of computers. Communication between components of the trading environment 100 may be over any type of network. However, very high speed connections are desirable for communications within electronic trading environment 100, and particularly for inter-component communication within trading system 110.

Figure 2:
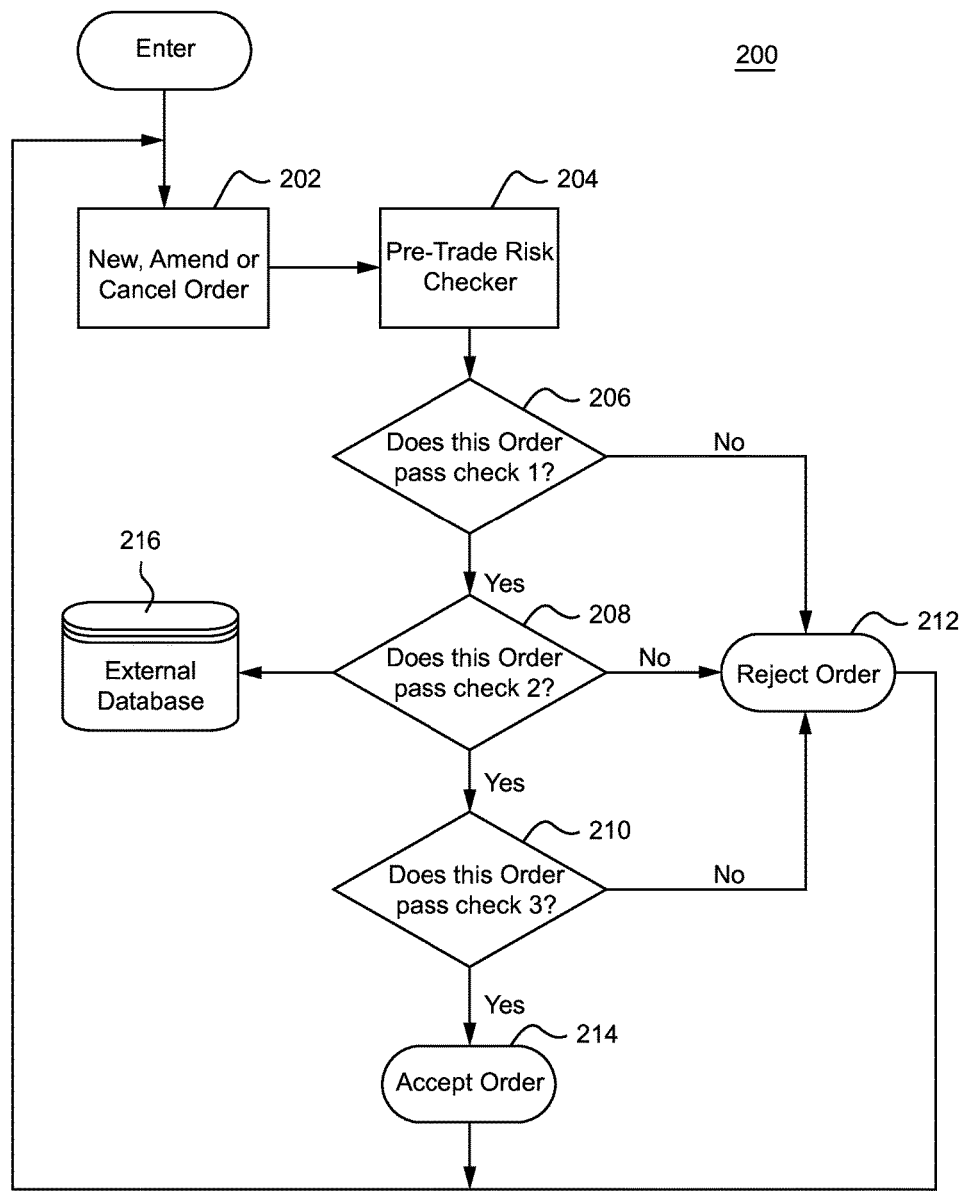
FIG. 2 is a flowchart of a process for processing an order in a trading system, in accordance with certain example embodiments.

FIG. 2 is a flowchart of a process 200 for the processing of an order in a pre-trade risk checking system, such as, the pre-trade risk checker 106, in accordance with certain example embodiments. Both FIGS. 1 and 2 are illustrated with three pre-trade risk rules in order to simplify the discussion, but a person skilled in the art will understand that this number can be, and generally is, much larger (e.g., 10-20 or even larger). These rules can execute arbitrary code, which at least implies that they could in principle take an unbounded amount or widely varying amounts of time to execute and provide a result. Some rules may require querying a database external to the system, e.g., as shown in FIG. 2; access to external resources could add unknown latencies because of factors such as message queues, network latency, database performance/overload, and/or the like.

After entering the process 200, at step 202 a trading order is received. The received order may have been initiated by an automated trading program (e.g., a separate computer program that executes an algorithm based on monitoring and analyzing information including financial market information) or an operator/trader. The order may be received by, for example, the trading system interface 102 via a user interface (e.g., a graphical user interface). The received order may be a new order, an amended order, or an order to cancel a currently active order.

Thereafter, at step 204, the received order is provided to a pre-trade risk checker, such as pre-trade risk checker 106, for processing. The processing at the pre-trade risk checker may include executing three rule checking step 206, 208, and 210, e.g., to determine respectively whether the order passes three separate rules. If any of the steps 206, 208, and 210 indicate that the order does not pass the corresponding rule, then at step 212, the order is rejected and the process 200 proceeds to step 202 where the next order is taken for processing.

If all of the rule check step 206, 208, and 210 result in passing the order, then at step 214, the order is accepted and the process 200 returns to step 202 to begin processing the next order. Accepting the order at step 214 may include transmitting, or causing the transmission of, the order to the trading exchange.

During the processing of rule check step 208, process 200 may access one or more external databases 216. For example, an external database that includes current pricing, available quantities and other information regarding securities may be accessed during any of the rule check processing operations. A rule that requires the pre-trade risk checker to access an external system such as an external database (e.g., to obtain a traders position) is likely to be affected by several factors such as, for example, network latency, processing queues in the database, database performance, etc., that can increase its processing time. These factors may change frequently, altering the processing time of the rule and the time it takes to respond to a query. On the other hand, a simple rule that just checks whether a price is between two hard limits may have a very predictable response time.

An aspect of processing the pre-trade risk checks is the order or sequence in which they are applied to an input order. A synchronous system can be configured to query a rule (e.g., rules 206, 208 or 210) and wait for a response before moving onto the next rule. An asynchronous system can be configured to send queries to all available rules at once, and wait for responses to all the queries. Certain example embodiments may include a hybrid system where some rules are run synchronously and some asynchronously. Although an asynchronous system can be designed to process rules in parallel, the amount of parallelism may be limited by hardware constraints (e.g., available CPUs, external database locks, etc.) and it is unlikely to be able to process all rules at the same time, especially with a high number of rules. In such cases, a hybrid system where some rules will still be processed in a serial manner is possible. When it has queried all available risk checks and all queries have passed the order, the order is sent to the trading exchange. If any risk check rule failed the order, the order is not sent to the exchange, and instead a notification is sent to the trading system indicating the failure of the order.

Various metrics can be calculated for each of the pre-trade risk check rules, such as, for example: processing time (e.g., the time interval between sending a query to the corresponding rule processor and receiving the corresponding response), the proportion of orders rejected based on the rule, etc. The metrics may relate to the performance (e.g., processing time, percentage rejected, etc.) of the particular rule with respect to each order to which it was applied.

One or more of the calculated metrics may be used to alter the order in which the rules are processed in, and to determine which rules are better to run asynchronously or synchronously, e.g., in order to improve the performance of the pre-trade risk checker and therefore the trading system as a whole. The metrics can be either continuously monitored in order to continuously refine the rule processing order, checked at pre-set time intervals (e.g., every 30 seconds), or a metric can be used to determine when the processing order should be recalculated. According to certain example embodiments, the trading system can monitor itself and dynamically decide to not re-calculate if it is under high load (e.g., if it would just add further latency to the system). In certain example embodiments, the trading system can measure how much time the re-calculations are taking (and store these in the metric repository) and dynamically update the re-calculating time interval. If the moving average of the re-calculation time is high (e.g., compared to the time to process an order), the trading system may operate to extend the time interval, or if the moving average is very short then the trading system can reduce the time interval.

Figure 3:
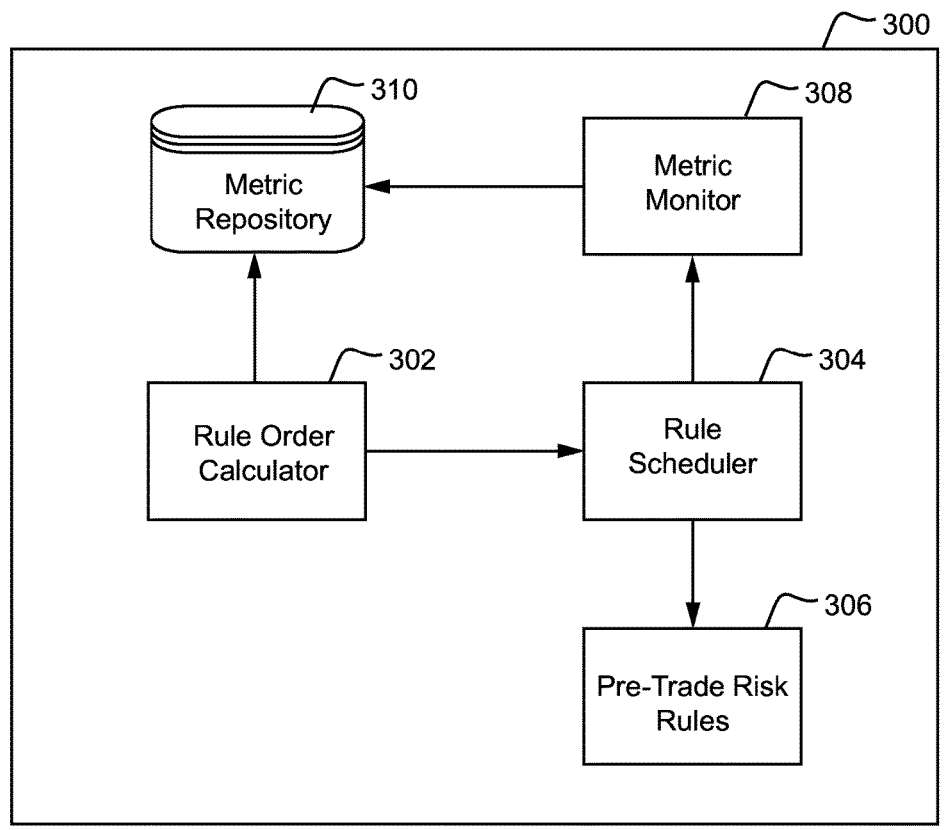
FIG. 3 is a block diagram illustration of a pre-trade risk checking system, in accordance with certain example embodiments.

FIG. 3 illustrates components of a pre-trade risk checking system 300 in accordance with certain example embodiments. Pre-trade risk checking system 300 includes a rule order calculator 302, rule scheduler 304, a pre-trade risk rules store 306, a metric monitor 308, and a metric repository 310.

The metric monitor 308 operates to calculate and/or collect metrics for each evaluated order for every rule from pre-trade risk rule store 306. The calculated and/or collected metrics are stored in the metric repository 310. Metric repository 310 may be external storage (e.g., a database) and/or local storage (e.g., standard list/map data structures in local memory). At least one metric may be required for each rule in rule store 306. Sufficient information is stored in repository 310 to enable each rule to provide at least a single metric value. For example, if a metric measures the proportion of rejected orders, the repository 310 may be configured to store a value for the total number of orders processed and the number of orders rejected, so that the percentage of rejected orders can be calculated. In certain example embodiments, the rule will also be configured to purge the repository of older information in order to help ensure the at least one metric value of the rule is valid for a reasonable timeframe. Each rule may have a user set configuration value to signify a timeframe for which that value is valid for before it is automatically purged from the repository. In this example, the rule could purge values older than 5 minutes, as orders older than that are no longer valid and should not be taken into account when tuning the pre-trade risk checker.

The configuration of the pre-trade risk checking system may determine which metrics are calculated (and therefore what variables are stored in the repository), and on what metrics the re-ordering of the rules would be processed, and when the re-ordering would happen (either after every order, at certain time intervals, when triggered by a human or predefined event, etc.). When the pre-trade risk checking system has determined that it can optimize itself and re-order the processing order of the rules, a rule order calculator 302 can use the stored values in the metric repository 310 to calculate the optimal order in which to process the rules. It may then update the rule scheduler 304 with a new sequencing in which to process the risk checking rules, and the process may start again.

The rule order calculator 302 operates to create a rule processing map (also called rule map) that identifies rules that can be run in a synchronous mode and the order or sequence in which they are executed, and rules that can be run asynchronously and their order or sequence. The rule order calculator 302 can use the stored metric values for each of the rules in order to create the rule map. Configuration parameters for the trading system 110 may specify a number of rules that may be run in parallel (e.g., based on a maximum number of parallel threads or number of physical or virtual CPUs). For example, if the configuration specifies that only two rules can be run in parallel at a time, but there are three rules that must be processed for each order, the rule map may specify which rules are run in parallel, and which are run sequentially and also the order in which they are run. The calculator 302 may operates to choose which two rules it will run in parallel, and which rule is left to run in serial.

Communication within the pre-trade risk checker 300 may be facilitated via an event bus. Orders that need to be processed, communication from the rule scheduler to each of the risk checks, orders that need to be sent to an exchange or failure notifications, etc., may all be on this event bus. The faster an order is verified by the risk checking system and sent to the exchange, the higher the chance of a successful trading opportunity. Conversely, the faster an order is rejected, the faster a correction can be made, and there would be less wasted time and processing.

FIG. 4 shows a simplified example rule map which indicates that rule 2 and 3 will be processed in parallel in a first thread, and that rule 1 will be run after rule 3 has finished. The example map shown in FIG. 4 may be used, for example, when it is known that rule 2 is a long running rule. A long running rule has a longer processing time than most of the rules in the sequence of rules.

The configuration of the system can be read in from a file (e.g., a configuration file) on system start-up by various parts of the system. Example configuration parameters that can be read in from a configuration file are shown in FIG. 5. These example parameters may include: a rules parameter indicating the names of rules for the system; a metrics parameter indicating the names of metrics to keep track of (e.g., to be monitored by metric monitor 308); a threads parameter indicating the number of concurrent threads that can be executed; a timeout parameter indicating how often the rule map will be recalculated; a weights parameter indicating the weights to be assigned to respective metrics; and/or the like.

The rules parameter may be used primarily by the rules scheduler 304. The rules parameter identifies the rules that are currently active. The metrics parameter may be used, at least primarily, by the metric monitor 308. The threads parameter, the timeout parameter, and the weights parameter can be used by the rules order calculator 302.

At least some of the configuration parameters can also dynamically be updated when the system is running This can be done, for example, via an application programming interface (API) call into the rule order calculator to allow the number of threads, timeout, or metric weights to be updated immediately while the system is running and does not require a re-start.

The table in FIG. 6 shows simplified exemplary metrics for three rules that can be referred to as K, L, and M. K is a long running test (e.g., 25 ms processing time), but only rejects a small (e.g., 0.01%) proportion of orders. M is quick (1 ms) but rejects a high proportion (e.g., 25%) of orders. L is somewhere in between (e.g., 2% rejections and 10 ms processing time).

The trading system determines the number of executable threads based on the configuration parameters. In the example described, given that there are two threads running, there can be six possible maps for the rules. FIG. 7 illustrates a technique to calculate which rule map is the best.

More particularly, FIG. 7 illustrates six possible rule maps, with two columns representing each map. The two columns correspond to two threads T1 and T2 that can be run parallel. Each map specifies the arranging of rules K, L, and M in threads T1 and T2.

As can be seen in FIG. 7, there are two rule maps (maps 2 and 4) that yield the same lowest latency value for passed orders. For rejected orders, an average latency (in this example for 10,000 orders) can be determined given that the reject percentage and processing time are known. The number of orders each rule rejects (which for serial rules may depend on the number of orders passed by the preceding rule—e.g., rule M rejects 25% of orders, so for 10,000, it will only pass 7,500 on to a rule to be processed after it) can be determined. Thereafter, the orders rejected for each rule can be multiplied by the processing time, the results are summed for all rules and divided by the total number of order rejected. It can be seen in FIG. 7 that map 4 has the lowest reject order latency. Thus, map 4 may be the selected rule map to be used for pre-trade processing of the order.

Figure 8:
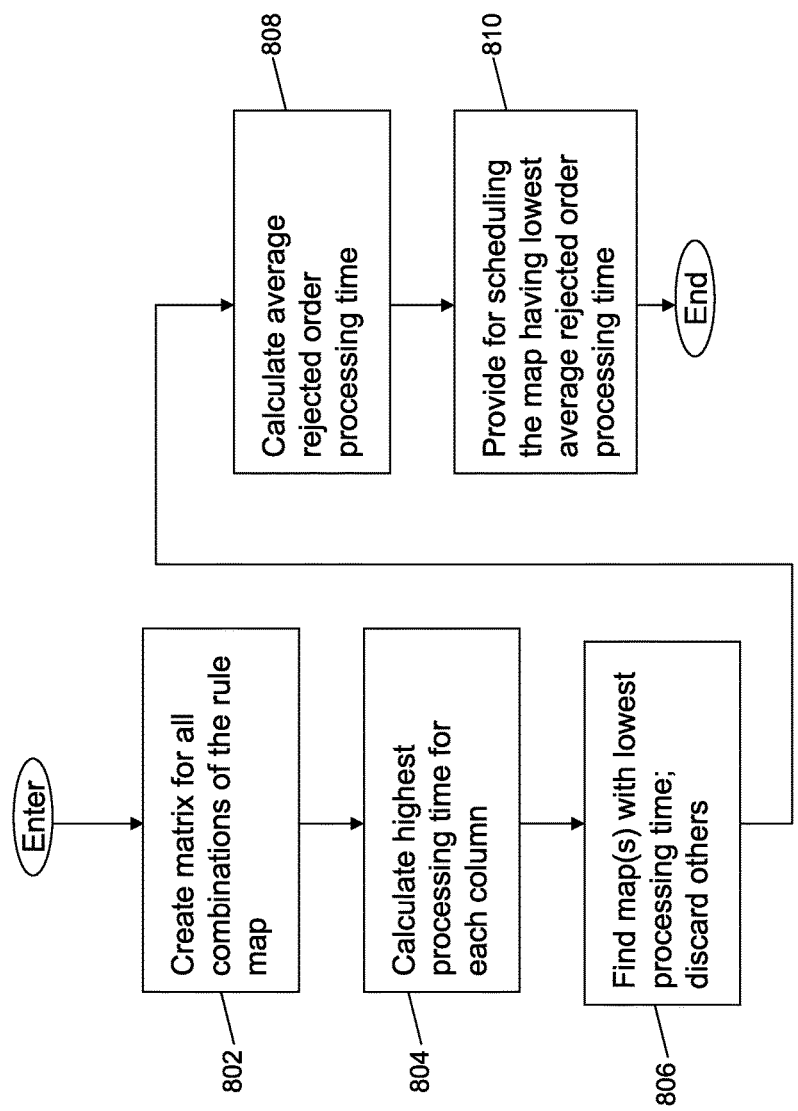
FIG. 8 is a flowchart of a process for generating a rule map, in accordance with certain example embodiments.

The calculation operation performed by rule order calculator 302, for this example, is illustrated in FIG. 8. FIG. 8 is a flowchart of a process 800 for selecting a rule map, in accordance with certain example embodiments.

After entering process 800, at step 802, a matrix of all possible combinations of rule maps, with the number of columns being the number of processing threads, is generated. An example matrix showing all possible rule maps is shown in FIG. 7, as indicated above.

At step 804, the highest processing time for each column is calculated based on the collected metrics. Each map is assigned its highest column (e.g., corresponding to the first or second thread) value.

At step 806, the map or maps with the lowest processing time value are identified, and the rest are discarded.

At step 808, for each of the identified maps, the average rejected order processing time is calculated.

At step 810, the map with the lowest average rejected order processing time is identified and provided to the rule scheduler.

Process 800 is an example of how to calculate the rule processing map using these metrics. Many other metrics and corresponding calculations may be used in different example embodiments. For instance, this example assumes the processing times of a passed and rejected order are the same, but they could be different, and this would impact the calculation result. It may also be that the user wishes to run the system purely in synchronous mode and only take into account one of the metrics. Alternatively, the user may want to assign a higher priority to one of the metrics and weight the results to favor that metric.

Figure 9:
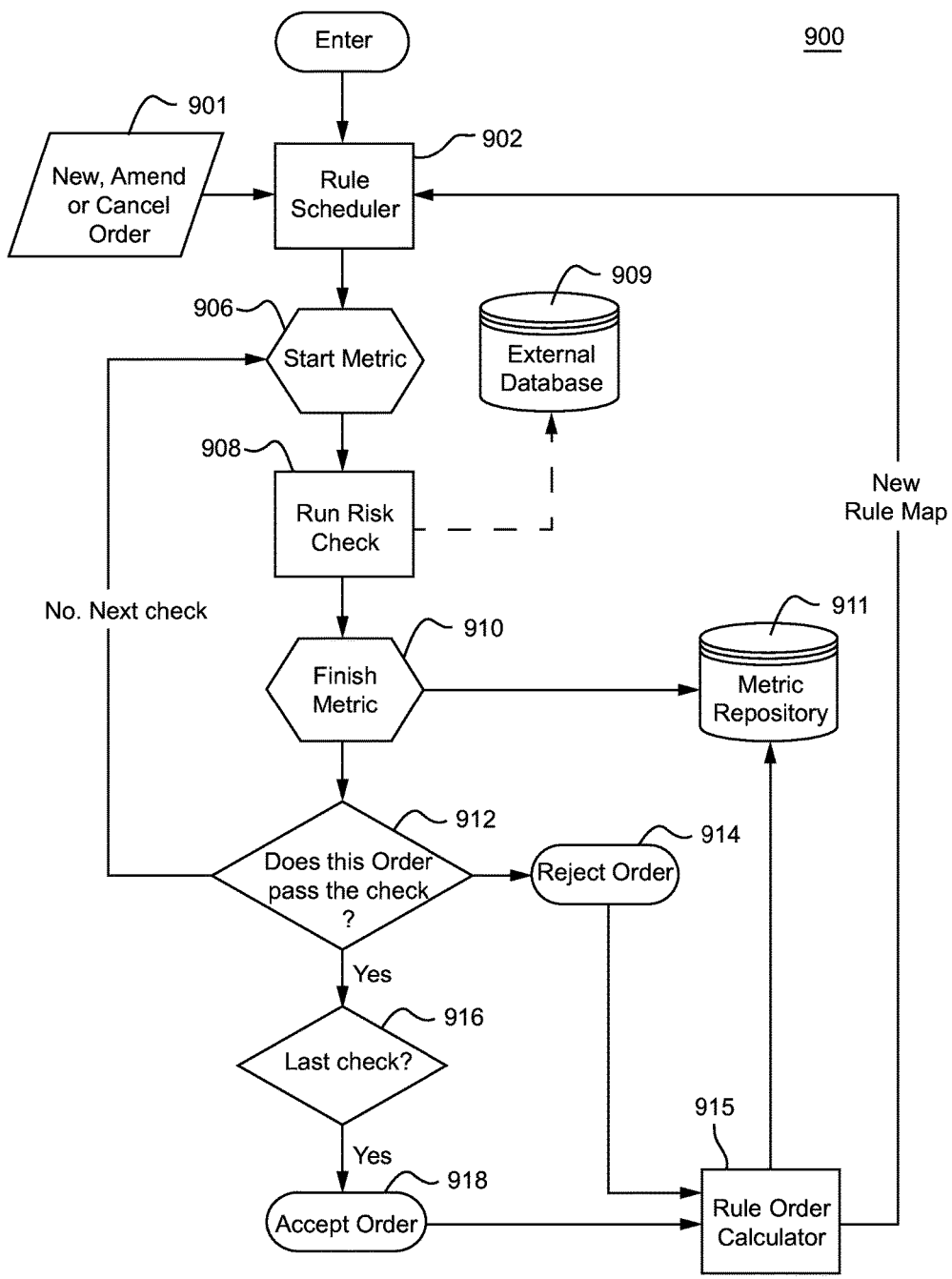
FIG. 9 is a flowchart of a process to synchronously execute pre-order risk checks in a trading system, according to certain example embodiments.

FIG. 9 is a flowchart of a process 900 to synchronously execute pre-order risk checks in a trading system, according to certain example embodiments. Process 900 may be executed by pre-trade risk checker 300 illustrated in FIG. 3.

After entering process 900, an order is received. The received order 901 may be a new order, an amended order or a cancellation order.

At step 902 a rule scheduler is entered. The rule scheduler selects a rule map to apply against the receive order. The rule map specifies the rules to be applied and the order in which they should be applied. In this example embodiment, a single rule map is used to apply against incoming rules. The rule map is continuously updated in real-time as order processing continues in the trading system. In certain other example embodiments, however, more than one current rule map may be available, and the rule scheduler may select among them based on criteria including aspects of the received order such as the type of order (e.g., type of security, quantity, etc.).

At step 906, metric collection is started.

At step 908, the next risk check in the sequence according to the selected rule map is executed. The executing of the risk check may include accessing one or more external resources, such as, for example, an external database 909.

At step 910, the metric collection is completed for the just executed pre-trade risk check rule. Completing the metric collection may include updating a metric repository 911.

At step 912, it is determined whether the order 901 passed the just executed rule. If the order did not pass the rule, then at step 914, the order is rejected, and the rule order calculator 915 is informed.

If, at step 912, it is determined that order 901 passed the rule, then at step 916 it is determined whether the rules are completed. If yes, at step 918 the determination is made to accept the order, and rule order calculator 915 is informed.

If, it is determined at step 916 that more rules are to be executed, then process 900 proceeds to step 906. Steps 906-914 are repeated until all rules in the currently selected rule map have been applied to the order 901.

Rule order calculator 915, having received information from the order processing, such as the rejected/updated information, information regarding which rules cause the rejections, metrics (e.g., execution time etc), may then recalculate one or more rule maps. A process such as process 800 may be used to determine a new rule map. The updated one or more rule maps are then provided to the rule scheduler.

Figure 10:
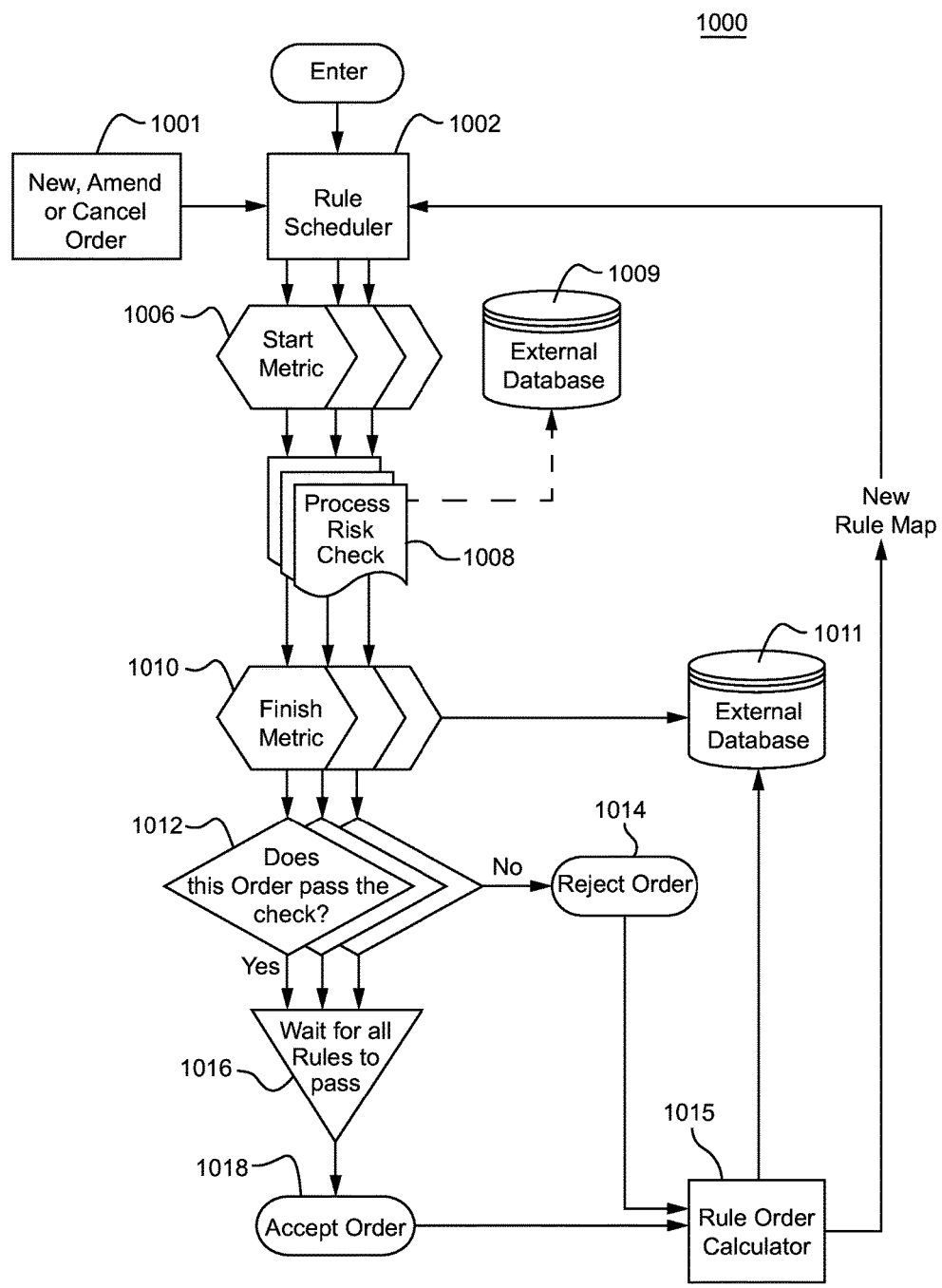
FIG. 10 is a flowchart of a process to asynchronously execute pre-order risk checks in a trading system, according to certain example embodiments.

FIG. 10 is a flowchart of a process 1000 to asynchronously execute pre-order risk checks in a trading system, according to certain example embodiments. Process 1000 may be executed by pre-trade risk checker 300 illustrated in FIG. 3.

After entering process 1000, an order is received. The received order 1001 may be a new order, an amended order, a cancellation order, etc.

At step 1002 a rule scheduler is entered. The rule scheduler selects a rule map to apply against the receive order. The rule map specifies the rules to be applied and the order in which they should be applied. In this example embodiment, a single rule map is used to apply against incoming rules. The rule map is continuously updated in real-time as order processing continues in the trading system. In certain other example embodiments, however, more than one current rule map may be available, and the rule scheduler may select among them based on criteria including aspects of the received order such as the type of order (e.g., type of security, quantity, etc.).

At step 1006, metric collection is started. Certain example embodiments assume that plural rules are applied at the same or substantially the same time. For each rule to be executed, a separate metric collection is started.

At step 1008, the risk check rules in the sequence according to the selected rule map are executed. The executing of the risk check may include accessing one or more external resources, such as, for example, an external database 1009.

At step 1010, the metric collection is completed for the just executed pre-trade risk check rule. Completing the metric collection may include updating a metric repository 1011.

At step 1012, it is determined whether the order 1001 passed the just executed rule. If the order did not pass the rule, then at step 1014, the order is rejected and the rule order calculator 1015 is informed.

If, at step 1012, it is determined that order 1001 passed the rule, then at step 1016 it is determined whether the rules are completed. If yes, at step 1018 the determination is made to accept the order, and rule order calculator 1015 is informed.

If, it is determined at step 1016, that more rules are to be executed, then process 1000 proceeds to step 1006. Steps 1006-1014 are repeated until all rules in the currently selected rule map has been applied to the order 1001.

Rule order calculator 1015, having received information from the order processing, such as the rejected/updated information, information regarding which rules cause the rejections, metrics (e.g., execution time, etc.), may then recalculate one or more rule maps. A process such as process 800 may be used to determine a new rule map. The updated one or more rule maps are then provided to the rule scheduler.

FIG. 11 is a listing of pseudocode 1100 for an example implementation of a metric for determining a reject rate, according to certain example embodiments. For each rule, its reject rate represents the ratio of order failures due to the rule, to total orders to which the rule is applied.

FIG. 12 is a listing of pseudocode 1200 for an example implementation of a metric for determining processing time, according to certain example embodiments. For each rule, its corresponding processing time is represented by the ratio of the total time consumed for processing the rule, to the number of orders to which the rule is applied. In effect, the processing time for a rule is an average of the total time consumed for the rule.

FIG. 13 is a listing of pseudocode 1300 for an example implementation of a synchronous rule processor for use in a pre-trade risk checking process, according to certain example embodiments.

FIG. 14 is a listing of pseudocode 1400 for an example implementation of a pre-trade risk checker, with synchronous rule processing, according to certain example embodiments.

FIG. 15 is a listing of pseudocode 1500 for an example implementation of an asynchronous rule processor for use in a pre-trade risk checking process, according to certain example embodiments.

FIG. 16 illustrates a listing of pseudocode 1600 for an example implementation of a pre-trade risk checker, with asynchronous rule processing, according to certain example embodiments.

Figure 17:
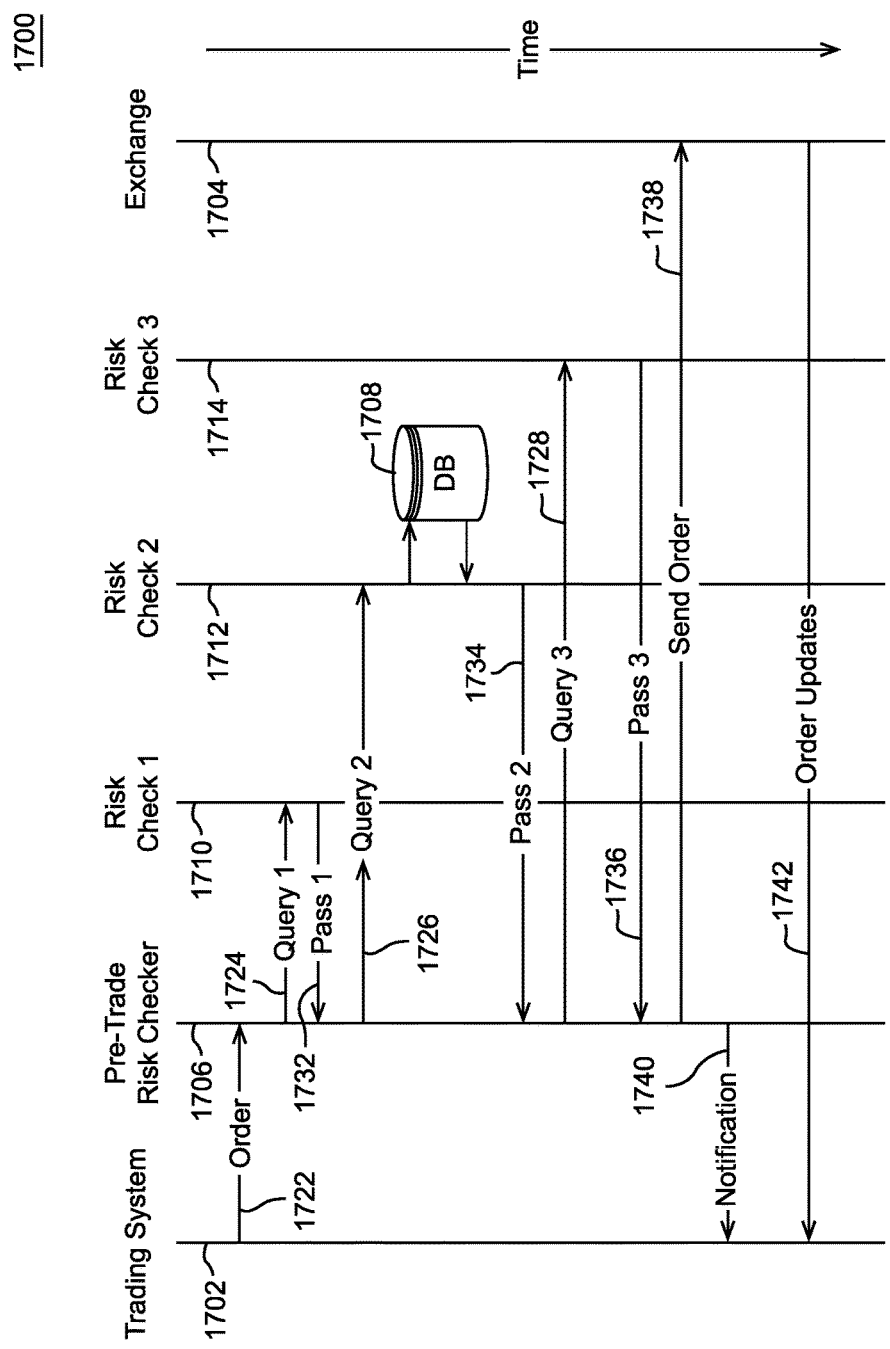
FIG. 17 illustrates a process flow of a trade order transaction in a trading environment with successfully executed synchronous pre-trade checking rules, according to certain example embodiments.

FIG. 17 illustrates a process flow 1700 of a trade order transaction in a trading environment, according to certain example embodiments. Process 1700, for example, may be performed in trading environment 100 in order to transact an order (e.g., securities trading order) entered into trading system 110. Process flow 1700 illustrates a scenario where pre-trade risk check rules are synchronously applied to obtain a successful result for the order (e.g., successfully pass all applied rules).

The process flow 1700 may be initiated when an order 1722 is entered into trading system 1702.

The order 1722 is provided to a pre-trade risk checker 1706 to help ensure that the order satisfies the relevant rules for being submitted to the trading exchange 1704.

The pre-trade risk checker 1706 proceeds to apply each rule 1710, 1712, and 1714 of a sequence of pre-trade risk check rules to the order 1722. When synchronous rule application is used, such as in this process flow 1700, the rules 1710, 1712 and 1714 are applied one after another. Each rule may be applied by, querying (e.g., 1724, 1726, 1728) a respective rule processor 1710, 1712, or 1714 (e.g., with each rule processor processing a respective rule with respect to the order), and receiving indications (e.g., 1732, 1734, 1736) as to whether the order 1722 passed the corresponding rule. One or more of the rule processors, such as rule processor 1712, may access an external resource 1708 during the processing of the rule.

If all rule processors return indications that the order has passed, then the pre-trade risk checker 1706 transmits the order 1722, now referred to as verified order 1738, to the trading exchange 1704. The pre-trade risk checker 1706 may provide a notification 1740 to the trading system 1702 indicating that the order has been submitted to the trading exchange 1704. Subsequently, the trading exchange 1704 transmits an order update message 1742 to the trading system 1702 indicating whether the order was successful, and any other relevant details.

The total time expended in order to achieve the result of process flow 1700 includes the sum of the time required for processing each of the rules 1710, 1712, and 1714.

Figure 18:
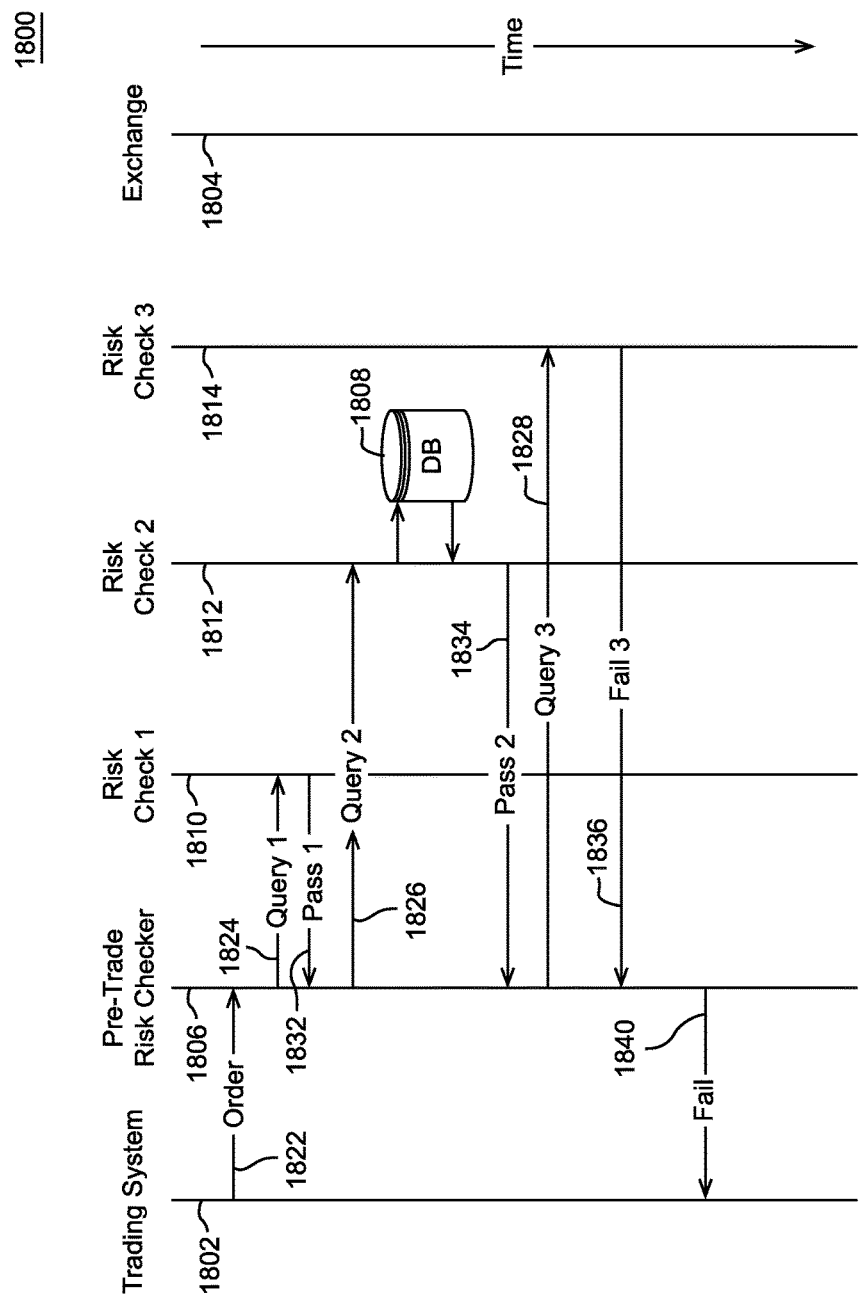
FIG. 18 illustrates a process flow of a trade order transaction in a trading environment with synchronous pre-trade checking rules and at least one rule failure.

FIG. 18 illustrates a process flow 1800 of a trade order transaction in a trading environment, according to certain example embodiments. Process 1800, for example, may be performed in trading environment 100 in order to complete a transaction to process an order entered into trading system 110. Process flow 1800 illustrates a scenario where pre-trade risk check rules are synchronously applied, but results in a failed order (e.g., the order fails to pass one or more rules).

The process flow 1800 may be initiated when an order 1822 is entered into trading system 1802.

The order 1822 is provided to a pre-trade risk checker 1806 in order to help ensure that the order satisfies the relevant rules for it being submitted to the trading exchange 1804.

The pre-trade risk checker 1806 proceeds to apply each rule 1810, 1812, and 1814 of a sequence of pre-trade risk check rules to the order 1822. The rules 1810, 1812m and 1814 are applied one after another. Each rule may be applied by, querying (e.g., 1824, 1826, 1828) a respective rule processor 1810, 1812 or 1814, and receiving indications (e.g., 1832, 1834, 1836) as to whether the order 1822 passed the corresponding rule. One or more of the rule processors, such as rule processor 1812, may access an external resource 1808 during the processing of the rule.

In the example process flow 1800, rule processors 1810 and 1812 return successful indications 1832 and 1834 for passing the corresponding rules. However, rule processor 1814 returns a fail indication 1836.

Upon receiving the fail indication 1836, pre-trade risk checker provides an indication 1838 of failure to the trading system 1802.

The time consumed by process flow 1800 to return a failure indication includes the sum of the times used for processing rules 1810, 1812, and 1814.

Figure 19:
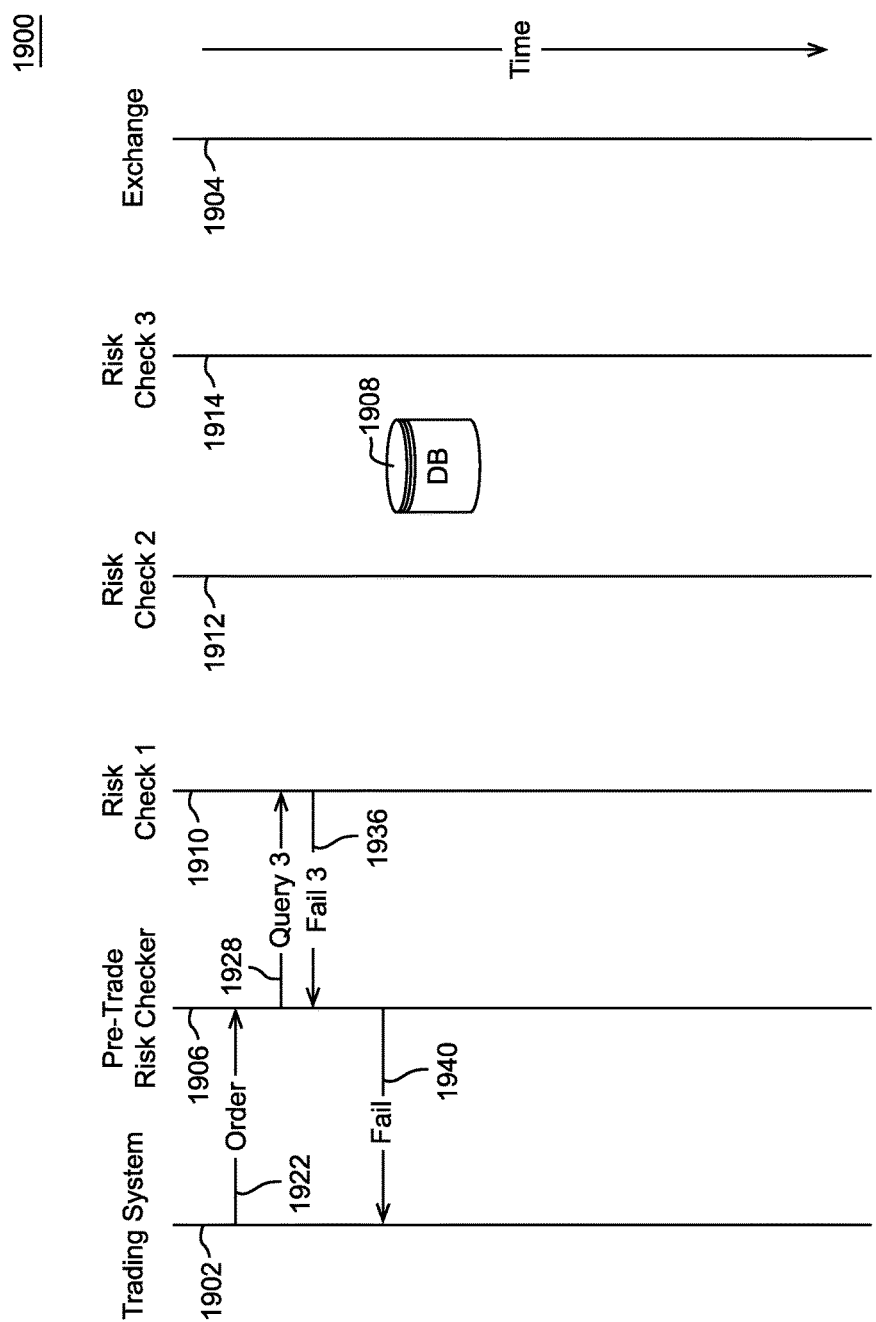
FIG. 19 illustrates a process flow of a trade order transaction in a trading environment with rearranged synchronous pre-trade checking rules and at least one failure, according to certain example embodiments.

FIG. 19 illustrates a process flow 1900 of a trade order transaction in a trading environment, according to certain example embodiments. Process 1900, for example, may be performed in trading environment 100 in order to complete a transaction to process an order entered into trading system 110. Process flow 1900 illustrates a scenario where pre-trade risk check rules are synchronously applied, but where the order fails the first applied rule. A comparison of process flows 1800 and 1900 would illustrate that, in process flow 1900, the rules have been rearranged such that rule three is applied to the order first (e.g., before rules two and one).

The process flow 1900 may be initiated when an order 1922 is entered into trading system 1902.

The order 1922 is provided to a pre-trade risk checker 1906 in order to help ensure that the order satisfies the relevant rules for it being submitted to the trading exchange 1904.

The pre-trade risk checker 1906 proceeds to apply the rule 1910 (in this case, after rearranging, rule 3) from a predetermined sequence of rules. The rule may be applied by transmitting a query 1928 to a rule processor 1910. In process flow 1900, the rules have been rearranged such that rule three (e.g., rule 1910) is applied first. Rule 1910 may be moved to the front of the sequence of rules to be applied because, as shown in process flow 1800, it may fail. As described above, by moving rules that are at a higher risk of failing to the front of the sequence, wasted time (e.g., in process flow 1800, the time consumed by processing rules 1810 and 1812 can be considered as wasted because the order was subsequently rejected when rule 1814 was processed) can be reduced.

In process flow 1900, in response to query 1928, rule processor 1910 for rule three returns a failure indication 1936 to the pre-trade risk checker 1906. The pre-trade risk checker 1906, then returns a failure notification 1940 to trading system 1902.

It is noted that according to process flow 1900, the total time elapsed to decide that the order has failed is the processing time of rule three 1910. The reduction of the time to decide that the order has failed is achieved by rearranging the sequence of rules to applied such that the rule three, which indicated a higher likelihood of failing, to the front.

Figure 20:
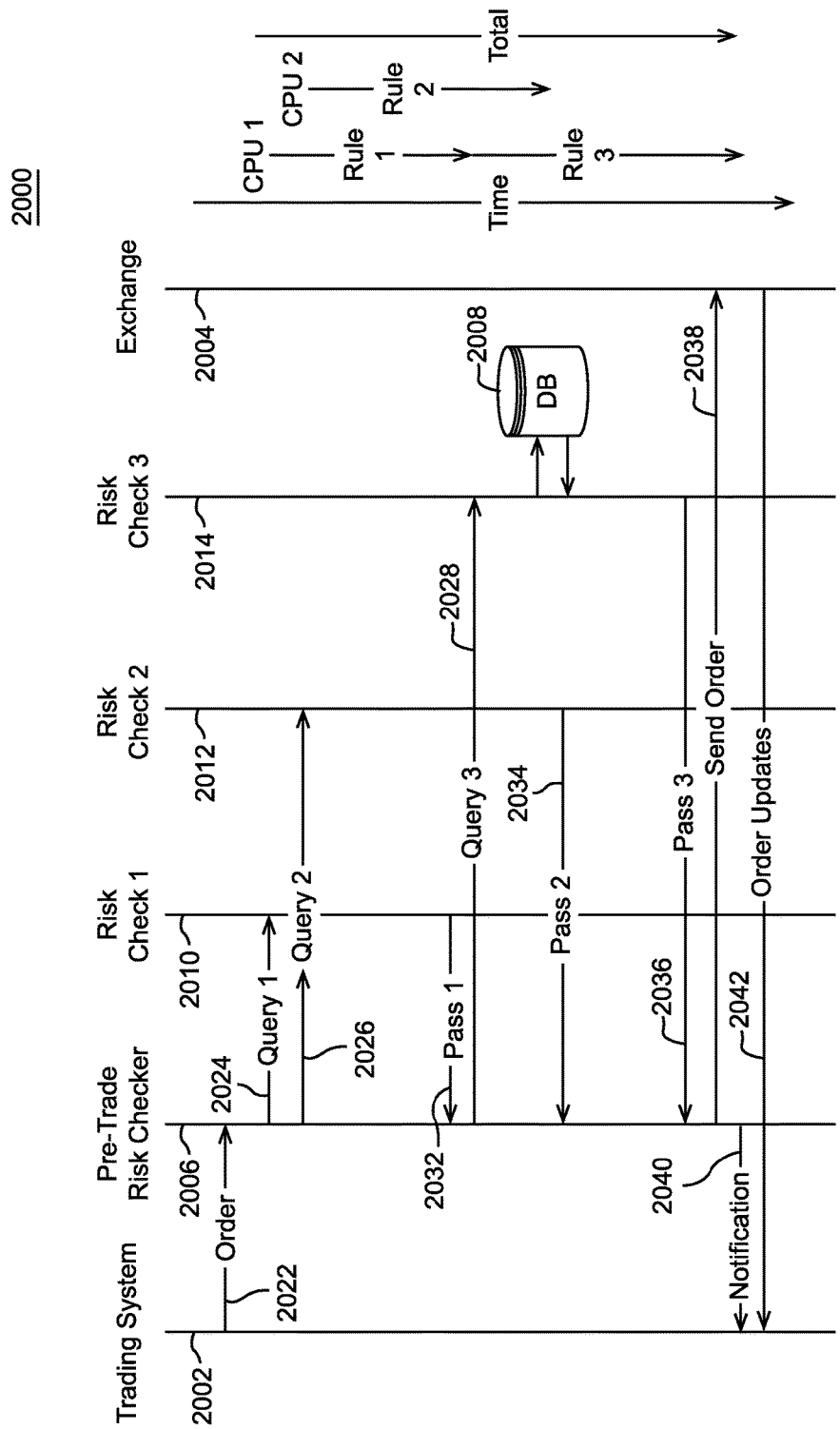
FIG. 20 illustrates a process flow of a trade order transaction in a trading environment with successfully executed asynchronous pre-trade checking rules, according to certain example embodiments.

FIG. 20 illustrates a process flow 2000 of a trade order transaction in a trading environment, according to certain example embodiments. Process 2000, for example, may be performed in trading environment 100 in order to complete a transaction to process an order entered into trading system 110. Process flow 2000 illustrates a scenario where pre-trade risk check rules are asynchronously applied to obtain a successful result for the order (e.g., successfully pass all applied rules).

The process flow 2000 may be initiated when an order 2022 is entered into trading system 2002.

The order 2022 is provided to a pre-trade risk checker 2006 in order to help ensure that the order satisfies the relevant rules for it being submitted to the trading exchange 2004.

The pre-trade risk checker 2006 proceeds to apply rules 2010, 2012, and 2014 of a sequence of pre-trade risk check rules to the order 2022. Two or more of the rules 2010, 2012, and 2014 can be applied simultaneously or substantially simultaneously. In the illustrated example, it has been predetermined that two threads can be executed: therefore, rules 1710 and 1714 are sequentially executed as the first thread (e.g., for example, on a first CPU) and rule 1712, which may be longer running, is executed separately in a second thread (e.g., on a second CPU). The first and second threads can be started simultaneously. Each rule is applied by, querying (e.g., 2024, 2026, 2028) a respective rule processor 2010, 2012, or 2014, and receiving indications (e.g., 2032, 2034, 2036) as to whether the order 2022 passed the corresponding rule. One or more of the rule processors, such as rule processor 2012, may access an external resource 2008 during the processing of the rule.

If all rule processors return indications that the order has passed, then the pre-trade risk checker 2006 transmits the order 2022, now referred to as 2038, to the trading exchange 2004. The pre-trade risk checker 2006 may provide a notification 2040 to the trading system 2002 indicating that the order has been submitted to the trading exchange 2004. Subsequently, the trading exchange 2004 transmits an order update message 2042 to the trading system 2002 indicating whether the order was successful, and any other relevant details.

The total time used for process flow 2000 corresponds to the longer of the first thread and the second thread.

Figure 21:
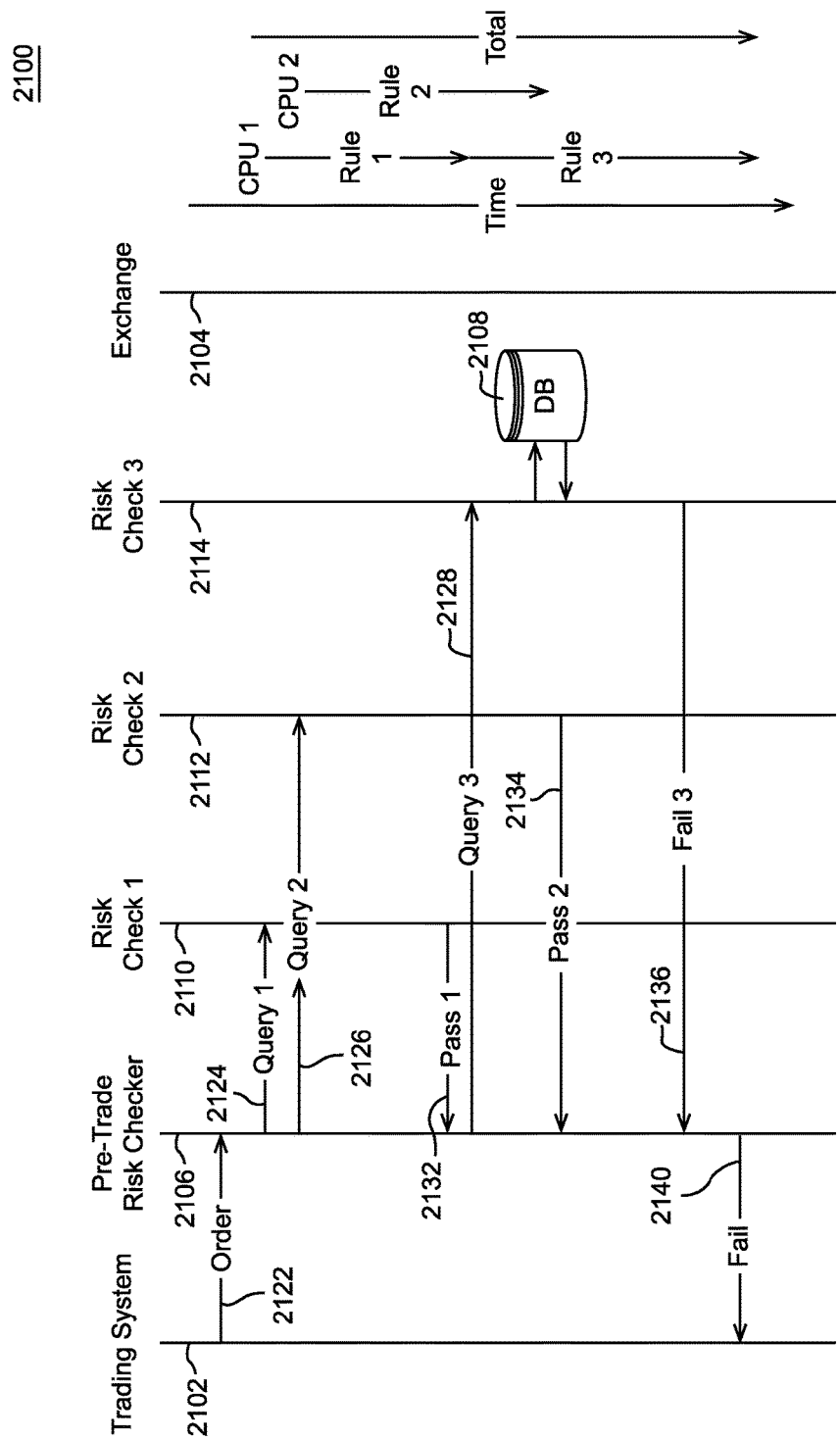
FIG. 21 illustrates a process flow of a trade order transaction in a trading environment with asynchronous pre-trade checking rules and at least one rule failure, according to certain example embodiments.

FIG. 21 illustrates a process flow 2100 of a trade order transaction in a trading environment, according to certain example embodiments. Process 2100, for example, may be performed in trading environment 100 in order to complete a transaction to process an order entered into trading system 110. Process flow 2100 illustrates a scenario where pre-trade risk check rules are asynchronously applied, but results in a failed order (e.g., the order fails to pass one or more rules).

The process flow 2100 may be initiated when an order 2122 is entered into trading system 2102.

The order 2122 is provided to a pre-trade risk checker 2106 in order to help ensure that the order satisfies the relevant rules for it being submitted to the trading exchange 2104.

The pre-trade risk checker 2106 proceeds to apply rules 2110, 2112 and 2114 of a sequence of pre-trade risk check rules to the order 2122. Two or more of the rules 2110, 2112 and 2114 are applied simultaneously or substantially simultaneously. In the illustrated example, it has been predetermined that two threads can be executed: Therefore, rules 2110 and 2114 are sequentially executed as the first thread (e.g., for example, on a first CPU) and rule 2112, which may be longer running, is executed separately in a second thread (e.g., on a second CPU). The first and second threads can be started simultaneously. Each rule is applied by, querying (e.g., 2124, 2126, 2128) a respective rule processor 2110, 2112, or 2114, and receiving indications (e.g., 2132, 2134, 2136) as to whether the order 2122 passed the corresponding rule. One or more of the rule processors, such as rule processor 2112, may access an external resource 2108 during the processing of the rule.

In the example process flow 2100, rule processors 2110 and 2112 return indications 2132 and 2134 for passing the corresponding rules. However, rule processor 2114 returns a fail indication 2136.

Upon receiving the fail indication 2136, pre-trade risk checker provides an indication 2138 of failure to the trading system 2102, and the order 2122 is not transmitted to the trading exchange 2104.

The time for deciding that the order has failed in process flow 2100 includes the shorter of the first and second threads.

Figure 22:
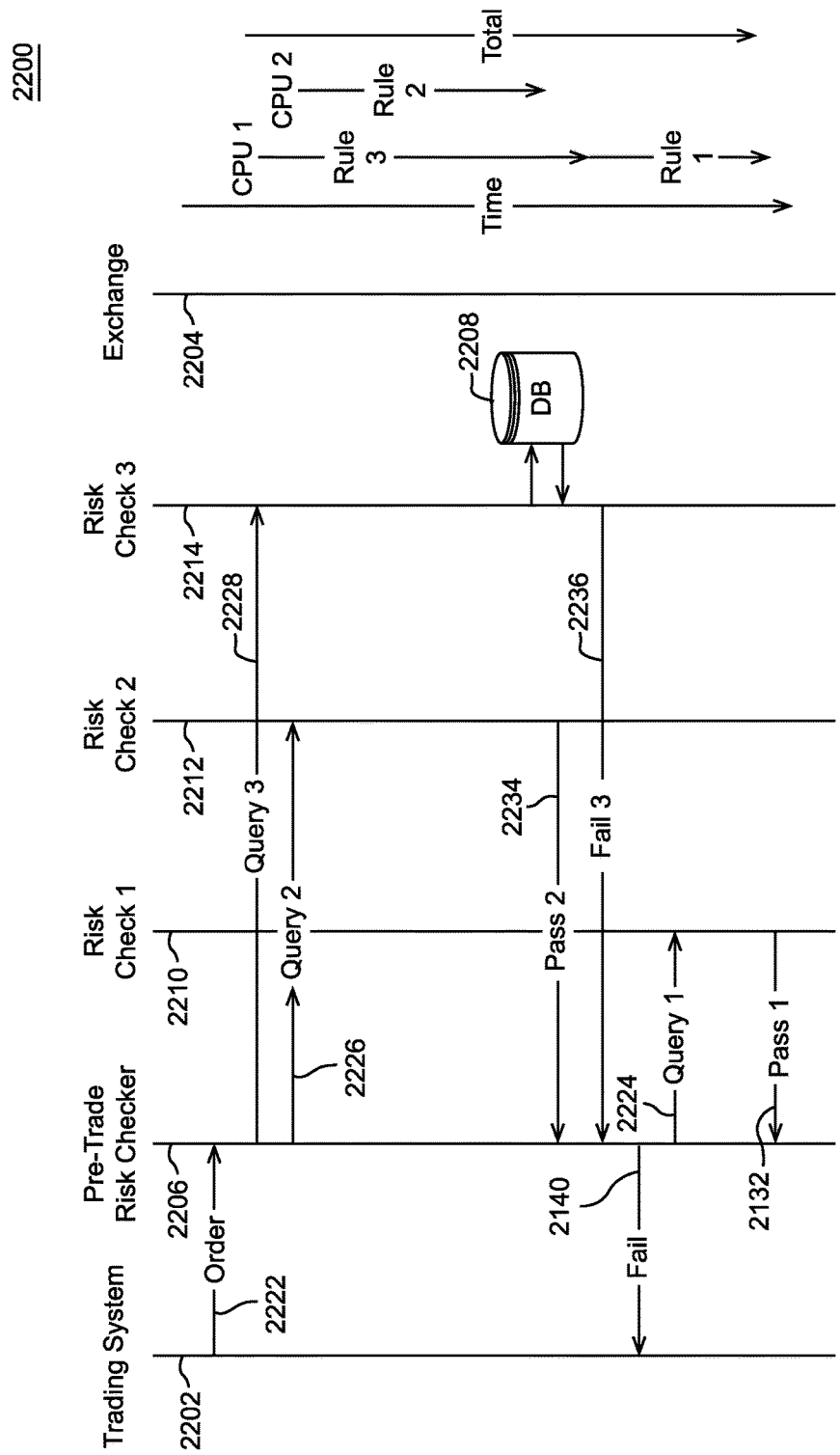
FIG. 22 illustrates a process flow of a trade order transaction in a trading environment with rearranged synchronous pre-trade checking rules and at least one failure, according to certain example embodiments.

FIG. 22 illustrates a process flow 2200 of a trade order transaction in a trading environment, according to certain example embodiments. Process 2200, for example, may be performed in trading environment 100 in order to complete a transaction to process an order entered into trading system 110. Process flow 2200 illustrates a scenario where pre-trade risk check rules are asynchronously applied, but where the order fails the first applied rule. A comparison of process flows 2100 and 2200 illustrates that, in process flow 2200, the rules have been rearranged such that rule three is applied to the order first (e.g., before rules two and one).

The process flow 2200 may be initiated when an order 2222 is entered into trading system 2202.

The order 2222 is provided to a pre-trade risk checker 2206 in order to help ensure that the order satisfies the relevant rules for it being submitted to the trading exchange 2204.

The pre-trade risk checker 2206 proceeds to apply the rule 2214 from a sequence of predetermined rules. The rule may be applied by issuing a query 2224 to a rule processor 2214. In process flow 2200, the rules have been rearranged such that rule three is (when compared to process flow 2100) applied first. Rule 2214 may be moved to the front of the sequence of rules to be applied in a particular thread, because, as shown in process flow 2100, it may fail. As described above, by moving rules that are at a higher risk of failing to the front of the sequence, wasted time (e.g., in process flow 2100, the time consumed by processing rules 1810 and 1812 can be considered as wasted because the order was subsequently rejected when rule 1814 was processed) can be reduced.

In process flow 2200, in response to query 2224, rule processor 2214 for rule three returns a failure indication 2236 to the pre-trade risk checker 2206. The pre-trade risk checker 2206, then returns a failure notification 2240 to trading system 2202. The order 2222 is not transmitted to the trading exchange.

The time for detecting the failure of the order according to process flow 2200 is the shortest of the processing times for queries 2210, 2212, and 2214. Thus, when compared to the time taken in process flow 2100 to determine that the order has failed, due to rearranging rule three (e.g., rule processor 2214) to the front of the sequence, process flow 2400 has reduced the time taken by the trading system to declare a rule to have failed.

Although certain example embodiments have been described in connection with Java and like languages, it will be appreciated that these languages are merely examples and may or may not necessarily correspond to a programming language that is used (or is to be used) in a different embodiments of this invention. Instead, it will be appreciated that the example techniques described herein are not dependent on any specific programming language and/or runtime environment.

A description of certain terms is provided below for aiding in the understanding of how certain example embodiments may operate. However, it is to be understood that the following descriptions are provided by way of example for explanatory purposes and should not be construed as being limiting on the claims, unless expressly noted.

| Term | Example Description |
|---|---|
| Asynchronous | Processing the rules once and potentially at the same time, and collating the results before moving on to the next stage of the system. |
| Black List | A generic name for a list used when filtering items to specify either the items or a characteristic of the items to be filtered out (e.g., a listing with a specific email address that email messages cannot be sent to, whereas email messages to all other addresses may be allowed). |
| Electronic Trading System | For example, in finance, an electronic trading system relates to a computer system that can be used to place orders for financial products over a network with a financial intermediary. This may include products such as stocks, bonds, currencies, commodities, derivatives, etc., with a financial intermediary, such as brokers, market makers, investment banks, stock exchanges, etc. Such platforms may allow electronic trading to be carried out by users from any location and may be contrasted with traditional floor trading using open outcry and telephone-based trading. |
| Exchange | For example, a marketplace in which securities, commodities, derivatives, and/or other financial instruments are traded. A function of an exchange (such as a stock exchange) is to help ensure fair and orderly trading, as well as efficient dissemination of price information for securities trading on that exchange. Exchanges may give companies, governments, and/or other groups a platform to sell securities to the investing public. |
| Order | For example, an investor's instructions to an exchange to purchase or sell a set quantity of a security at a specific price. |
| Position | The amount of a security either owned (which constitutes a long position) or borrowed (which constitutes a short position) by an individual or by a dealer or, in other words, a trade an investor currently holds open. |
| Static | Unchanging. |
| Synchronous | Processing rules one at a time, in order. The results of one rule must be returned before the next rule is processed. |
| Trader | For example, an individual who engages in the transfer of financial assets in any financial market, either for themselves, or on behalf of someone else. |
| White List | A generic name for a list used when filtering items to specify either the items or a characteristic of the items to be allowed to pass (e.g., a listing including a specific email address that email messages can be sent to, whereas email messages to other recipients will not be sent). |

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible computer readable storage medium. Cloud and/or distributed storage (e.g., using file sharing means), for instance, also may be used in certain example embodiments. It also will be appreciated that the techniques described herein may be accomplished by having a processor (e.g., central processing unit (CPU) or specialized processor) execute instructions that may be tangibly stored on a computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer system for pre-processing transaction requests, the computer system comprising:
   a non-transitory medium storing:
      a plurality of transaction evaluation rules, and
      a performance metrics dataset that includes results for how the plurality of transaction evaluation rules have been applied to a plurality of previously received transaction requests, wherein each entry in the dataset for a corresponding evaluation rule includes at least one of (1) a processing value that is based on a processing time for evaluating the corresponding evaluation rule against the plurality of previously received transaction requests and (2) a rejection value that is based on a number of times the corresponding evaluation rule rejected the plurality of previously received transact ion requests; and
   a processing system including at least one hardware processor that is operatively coupled to the non-transitory memory medium, the processing system being configured to perform operations comprising:
      enabling receipt of a first transaction request;
      perform a calculation process, based on the performance metrics dataset, that determines a sequence order in which the plurality of transact ion evaluation rules are to be applied;
      the calculation process including:
         create, based on 1) the number of concurrent processing threads used by the processing system to process the transaction evaluation rules and 2) the plurality of transaction evaluation rules, a plurality of evaluation rule maps, where each of the plurality of evaluation rule maps is a different arrangement of how the plurality of evaluation rules are ordered among each other and assigned to the concurrent processing threads,
         determine, for each of the plurality of evaluation rule maps, a processing time that is associated with how each of the different arrangements of the plurality of evaluation rules will execute,
         for the at least one of the plurality of evaluation rule maps that has the lowest determined processing time, calculate an average rejected order processing time, and
         set the determined sequencer order based on the arrangement of the evaluation rules for the evaluation rule map with the calculated lowest average rejected order processing time;
      processing, in accordance with the determined sequence order, at least some of the plurality of transaction evaluation rules against the first transact ion request;
      based on processing of the at least some of the plurality of transaction evaluation rules against the first transaction request, either transmitting the first transaction request to another computer system or rejecting the first transaction request such that it is not transmitted to the another computer system;
      updating the perfom lance metrics dataset based on how transaction evaluation rules were processed against the received first transaction request, where at least one of the processing value and the rejection value is updated;
      re-calculating a sequence order by using the calculation process in which the plurality of transact ion evaluation rules are to be applied based on the updated performance metrics dataset, wherein an order of at least one transaction evaluation rule is changed based on the re-calculation; and
      using the re-calculated sequence order when processing the transaction evaluation rules against a future transaction request.

2. The computer system according to claim 1, wherein the sequence order is calculated to minimize a processing time associated with processing the plurality of transaction evaluation rules against one or more transaction requests.

3. The computer system according to claim 2, wherein the first transaction request is rejected based on the first transaction request failing at least one of the plurality of processed transaction rules, and wherein the sequence order is determined to minimize a processing time for rejecting transaction requests.

4. The computer system according to claim 2, wherein calculation of the sequence order includes placing transaction evaluation rules having a longest processing time at a beginning part of the sequence order.

5. The computer system according to claim 4, wherein transaction evaluation rules having a higher number of rejected trading orders are arranged at the beginning of the sequence order.

6. The computer system of claim 1, wherein calculation of the sequence order further comprises:
   generating a plurality of rule maps, each generated rule map representing a respective arrangement of the plurality of transaction evaluation rules; and
   evaluating the one or more performance metrics for each of the generated rule maps;
   selecting a rule map based on the evaluating, wherein the sequence order is calculated based on the arrangement of the plurality of transaction evaluation rules in the selected rule map.

7. The computer system according to claim 6, wherein the arrangement in each rule map includes a sequence of one or more transaction evaluation rules for each of one or more executable threads.

8. The computer system according to claim 6, wherein there is a processing value for each arrangement, and wherein the rule map is selected so as to have a minimum said processing value as the selected rule map.

9. The computer system according to claim 8, wherein the processing value is for each arrangement, and wherein the rule map is selected to have a minimum said processing time for rejected orders as the selected rule map.

10. The computer system according to claim 1, wherein each evaluation rule includes at least one condition and the condition for each rule is updated based on processing of the at least some of the plurality of transaction evaluation rules against the first transaction request, where the condition is set to passed for the corresponding evaluation rule in accordance with the first transaction request satisfying the corresponding evaluation rule, and wherein the first transaction request is only transmitted based on all conditions of the at least some of the plurality of transaction evaluation rules having a passed condition.

11. The computer system according to claim 1, wherein the first transaction request is for a transaction in a securities item.

12. The computer system according to claim 11, wherein each of the transaction evaluation rules is a pre-trade risk checking rule for evaluating a risk of a transaction including securities.

13. The computer system according to claim 1, wherein the first transaction request is a request for a high frequency trading transaction.

14. An method for pre-processing transaction requests using a computer system that includes a transceiver and a processing system with at least one hardware processor, the method comprising:
  storing a plurality of transaction evaluation rules in a memory;
  storing, to the memory, a performance metrics dataset that includes results for how the plurality of transaction evaluation rules have been applied to a plurality of previously received transaction requests, wherein each entry in the dataset for a corresponding evaluation rule includes at least one of (1) a processing value that is based on a processing time for evaluating the corresponding evaluation rule against the plurality of previously received transaction requests and (2) a rejection value that is based on a number of times the corresponding evaluation rule rejected the plurality of previously received transaction requests;
  electronically receiving, via the transceiver, a first transaction request;
  performing a calculation process, using the processing system and the performance metrics dataset, that determines a sequence order in which the plurality of transaction evaluation rules are to be applied;
  the calculation process including:
    creating, based on 1) the number of concurrent processing threads used by the processing system to process the transaction evaluation rules and 2) the plurality of transaction evaluation rules, a plurality of evaluation rule maps, where each of the plurality of evaluation rule maps is a different arrangement of how the plurality of evaluation rules are ordered among each other and assigned to the concurrent processing threads,
    determining, for each of the plurality of evaluation rule maps, a processing time that is associated with how each of the different arrangements of the plurality of evaluation rules will execute,
    for the at least one of the plurality of evaluation rule maps that has the lowest determined processing time, calculating an average rejected order processing time, and
    setting the determined sequencer order based on the arrangement of the evaluation rules for the evaluation rule map with the calculated lowest average rejected order processing time;
  processing, in accordance with the determined sequence order, at least some of the plurality of transaction evaluation rules against the first transaction request;
  based on processing of the at least some of the plurality of transaction evaluation rules against the first transaction request, either transmitting the first transaction request to another computer system or rejecting the first transaction request such that it is not transmitted to the another computer system;
  updating the performance metrics dataset based on how transaction evaluation rules were processed against the received first transaction request, where at least one of the processing value and the rejection value is updated;
  re-calculating a sequence order by using the calculation process in which the plurality of transaction evaluation rules are to be applied based on the updated performance metrics dataset, wherein an order of at least one transaction evaluation rule is changed based on the re-calculation; and
  using the re-calculated sequence order when processing the transaction evaluation rules against a future transaction request.

15. The method according to claim 14, wherein the sequence order is calculated to minimize a processing time associated with how the sequence order is applied to transaction requests.

16. The method according to claim 15, wherein the first transaction request is rejected based on the first transaction request failing at least one of the processed transaction evaluation rules.

17. A non-transitory computer-readable storage medium having stored thereon computer program instructions for use with a pre-processing transaction computer system that includes at least one hardware processor and a transceiver, the computer program instructions comprising instructions that, when executed by the at least one hardware processor, cause the computer to perform operations comprising:
  storing a plurality of transaction evaluation rules in a memory;
  storing a performance metrics dataset that includes results for how the plurality of transaction evaluation rules have been applied to a plurality of previously received transaction requests, wherein each entry in the dataset for a corresponding evaluation rule includes at least one of (1) a processing value that is based on a processing time for evaluating the corresponding evaluation rule against the plurality of previously received transaction requests and (2) a rejection value that is based on a number of times the corresponding evaluation rule rejected the plurality of previously received transaction requests;
  enabling electronic receipt, via the transceiver, of a first transaction request;
  performing a calculation process, based on the performance metrics dataset, that determines a sequence order in which the plurality of transaction evaluation rules are to be applied;
  the calculation process including:
    creating, based on 1) the number of concurrent processing threads used by the processing system to process the transaction evaluation rules and 2) the plurality of transaction evaluation rules, a plurality of evaluation rule maps, where each of the plurality of evaluation rule maps is a different arrangement of how the plurality of evaluation rules are ordered among each other and assigned to the concurrent processing threads, determining, for each of the plurality of evaluation rule maps, a processing time that is associated with how each of the different arrangements of the plurality of evaluation rules will execute, for the at least one of the plurality of evaluation rule maps that has the lowest determined processing time, calculating an average rejected order processing time, and setting the determined sequencer order based on the arrangement of the evaluation rules for the evaluation rule map with the calculated lowest average rejected order processing time:

processing, in accordance with the determined sequence order, at least some of the plurality of transaction evaluation rules against the first transaction request;

based on processing of the at least some of the plurality of transaction evaluation rules against the first transaction request, either transmitting the first transaction request to another computer system or rejecting the first transaction request such that it is not transmitted to the another computer system;

updating the performance metrics dataset based on how transaction evaluation rules were processed against the received first transaction request, where at least one of the processing value and the rejection value is updated;

re-calculating a sequence order by using the calculation process in which the plurality of transaction evaluation rules are to be applied based on the updated performance metrics dataset, wherein an order of at least one transaction evaluation rule is changed based on the re-calculation; and using the re-calculated sequence order when processing the transaction evaluation rules against a future transaction request.

\* \* \* \* \*